United States Patent
Fukagawa et al.

(10) Patent No.: US 10,173,929 B2
(45) Date of Patent: Jan. 8, 2019

(54) SINTERING MATERIAL, AND POWDER FOR MANUFACTURING SINTERING MATERIAL

(71) Applicant: NIPPON YTTRIUM CO., LTD., Omuta-shi, Fukuoka (JP)

(72) Inventors: Naoki Fukagawa, Omuta (JP); Yuji Shigeyoshi, Omuta (JP)

(73) Assignee: NIPPON YTTRIUM CO., LTD., Omuta-Shi (JP)

( * ) Notice: Subject to any disclaimer, the term of this patent is extended or adjusted under 35 U.S.C. 154(b) by 0 days.

(21) Appl. No.: 15/545,799

(22) PCT Filed: Feb. 26, 2016

(86) PCT No.: PCT/JP2016/055810
§ 371 (c)(1),
(2) Date: Jul. 24, 2017

(87) PCT Pub. No.: WO2016/140159
PCT Pub. Date: Sep. 9, 2016

(65) Prior Publication Data
US 2018/0016193 A1   Jan. 18, 2018

(30) Foreign Application Priority Data
Mar. 5, 2015   (JP) .................. 2015-043963

(51) Int. Cl.
| C04B 35/553 | (2006.01) |
| C04B 35/505 | (2006.01) |
| C04B 35/50 | (2006.01) |
| C04B 35/622 | (2006.01) |
| C04B 35/626 | (2006.01) |
| C04B 35/634 | (2006.01) |
| C04B 35/64 | (2006.01) |
| B01J 2/00 | (2006.01) |
| C01F 17/00 | (2006.01) |

(52) U.S. Cl.
CPC ............ *C04B 35/553* (2013.01); *B01J 2/00* (2013.01); *C01F 17/0062* (2013.01); *C04B 35/50* (2013.01); *C04B 35/622* (2013.01); *C04B 35/6262* (2013.01); *C04B 35/62655* (2013.01); *C04B 35/62675* (2013.01); *C04B 35/62695* (2013.01); *C04B 35/6342* (2013.01); *C04B 35/63416* (2013.01); *C04B 35/63424* (2013.01); *C04B 35/63444* (2013.01); *C04B 35/63488* (2013.01); *C04B 35/64* (2013.01); *C01P 2002/72* (2013.01); *C01P 2002/74* (2013.01); *C01P 2004/61* (2013.01); *C01P 2004/62* (2013.01); *C01P 2006/11* (2013.01); *C04B 2235/3224* (2013.01); *C04B 2235/3225* (2013.01); *C04B 2235/3229* (2013.01); *C04B 2235/445* (2013.01); *C04B 2235/48* (2013.01); *C04B 2235/5436* (2013.01); *C04B 2235/5445* (2013.01); *C04B 2235/604* (2013.01); *C04B 2235/656* (2013.01); *C04B 2235/721* (2013.01); *C04B 2235/77* (2013.01); *C04B 2235/80* (2013.01)

(58) Field of Classification Search
CPC . C04B 35/505; C04B 35/553; C04B 41/5055; C23C 4/04; C23C 4/11
See application file for complete search history.

(56) References Cited

U.S. PATENT DOCUMENTS

| 5,061,560 A | 10/1991 | Tajima et al. |
| 9,388,485 B2 | 7/2016 | Fukagawa et al. |
| 9,914,993 B2 * | 3/2018 | Ibe ............................ C23C 4/04 |
| 2013/0122283 A1 * | 5/2013 | Hamaya .............. C01F 17/0062 428/328 |
| 2014/0057078 A1 | 2/2014 | Hamaya et al. |
| 2015/0096462 A1 | 4/2015 | Fukagawa et al. |
| 2015/0111037 A1 | 4/2015 | Fukagawa et al. |

(Continued)

FOREIGN PATENT DOCUMENTS

| JP | 7-57690 A | 6/1995 |
| JP | 2000-239066 A | 9/2000 |
| JP | 2000-239067 A | 9/2000 |
| TW | 200504189 A | 2/2005 |
| WO | WO 2014/002580 A1 | 1/2014 |
| WO | WO 2014/112171 A1 | 7/2014 |
| WO | WO 2015/019673 A1 | 2/2015 |

OTHER PUBLICATIONS

International Search Report, issued in PCT/JP2016/055810, PCT/ISA/210, dated May 24, 2016.

(Continued)

*Primary Examiner* — Karl E Group

(74) *Attorney, Agent, or Firm* — Birch, Stewart, Kolasch & Birch, LLP

(57) ABSTRACT

The present invention is a sintering material including a granule, the sintering material having an apparent tap density of 1.0 to 2.5 g/cm$^3$, a 50% cumulative volume particle diameter ($D_{50N}$) of 10 to 100 μm as measured before ultrasonication by laser diffraction/scattering particle size distribution analysis, a 50% cumulative volume particle diameter ($D_{50D}$) of 0.1 to 1.5 μm as measured after ultrasonication at 300 W for 15 minutes by laser diffraction/scattering particle size distribution analysis, and an X-ray diffraction pattern in which the maximum peak observed in the 2θ angle range of from 20° to 40° is assigned to a rare earth oxyfluoride of the form LnOF when analyzed by X-ray diffractometry using Cu—Kα or Cu—Kα$_1$ rays.

11 Claims, No Drawings

(56) References Cited

U.S. PATENT DOCUMENTS

| | | | |
|---|---|---|---|
| 2015/0225832 A1* | 8/2015 | Hamaya | C01F 17/0062 |
| | | | 428/328 |
| 2015/0307715 A1 | 10/2015 | Sato et al. | |
| 2015/0361540 A1* | 12/2015 | Hamaya | C09D 5/18 |
| | | | 501/126 |
| 2016/0244868 A1* | 8/2016 | Ibe | C23C 4/04 |

OTHER PUBLICATIONS

Office Action for JP 2016-540094 dated Feb. 9, 2017.
The Decision to Grant a Patent has been received for JP 2016-540094 dated Feb. 28, 2017.

* cited by examiner

SINTERING MATERIAL, AND POWDER FOR MANUFACTURING SINTERING MATERIAL

TECHNICAL FIELD

This invention relates to a sintering material and powder for preparing a sintering material.

BACKGROUND ART

A halogen gas is used in an etching step in the fabrication of semiconductor devices. In order to protect an etching apparatus from corrosion by halogen gas, the inner side of the etching apparatus is usually coated with a highly anti-corrosive substance by, for example, thermal spraying. It has also been practiced to construct the internal parts of the apparatus from a sintered body of a highly anti-corrosive substance. Materials containing a rare earth element are often used as such a substance.

Materials containing a rare earth element for use as a thermal spray material are usually granulated into flowable granules. Raw materials for use as a sintering material are also granulated.

Among known thermal spray materials containing a rare earth element is a particulate rare earth oxyfluoride having an aspect ratio of 2 or smaller, an average particle size of 10 to 100 μm, and a bulk density of 0.8 to 2 g/cm³ and containing not more than 0.5% by mass of carbon and 3 to 15% by mass of oxygen. It is known that this thermal spray material can be prepared by granulation (see Patent Literature 1 below).

There is a method for producing rare earth oxide solid spherical particles comprising dispersing a rare earth oxide powder with an average particle size of 1 μm or smaller in water to prepare a slurry and adding an organic acid salt to thereto, followed by spray drying. It is known that the resulting rare earth solid spherical particles are useful to make a sintered body (see Patent Literature 2).

A known method for producing a rare earth fluoride sintered body having high resistance to corrosion by a halogen-based plasma comprises molding a Group 3A metal fluoride powder containing a total of not more than 100 ppm of metal elements other than the group 3A metal and having an average particle size of 30 μm or smaller to form a green body of prescribed shape and firing the green body to a relative density of 95% or higher (see Paras. [0025]-[0028] of Patent Literature 3).

An oxyhalide-based member is disclosed, the part of which that is to be exposed to a halogen (e.g., fluorine or chlorine) corrosive gas or a halogen-based plasma is a sintered body represented by general formula: $LnZ_{3-2x}O_x$ (wherein Ln is one or more of Y, La, Ce, Pr, Nd, Sm, Eu, Gd, Tb, Dy, Ho, Er, Tm, Yb, and Lu; Z is one or more of F, Cl, Br, and I; and $0<X<1$) (see Para. [0005] of Patent Literature 4).

CITATION LIST

Patent Literature

Patent Literature 1: US 2014057078A1
Patent Literature 2: JP 7-57690B
Patent Literature 3: JP 2000-239066A
Patent Literature 4: JP 2000-239067A

SUMMARY OF INVENTION

Technical Problem

The rare earth oxyfluoride powder thermal spray material described in Patent Literature 1 provides a thermal spray coating having very high anti-corrosion properties. However, the resulting thermal spray coating tends to be less dense than a sintered body.

A less dense coating is more prone to particle shedding when exposed to a halogen-based plasma.

The rare earth oxide solid spherical particles according to Patent Literature 2 easily provide a dense sintered body. Being a rate earth oxide, however, the resulting sintered body, while resistant to corrosion by a fluorine-based plasma, has insufficient resistance to corrosion by a chlorine-based plasma.

It is very difficult to obtain a dense sintered body from the rare earth metal fluoride disclosed in Patent Literature 3, because the rare earth metal fluoride is a covalent compound.

Patent Literature 4 only discloses in its working example that a sample powder having an average particle size of 2 μm was sintered to make a sintered compact. The sample powder as described is inadequate for the task of providing a dense sintered body having sufficient resistance to corrosion by not only a fluorine-based plasma but a chlorine-based plasma.

Accordingly, an object of the invention is to provide a sintering material capable of producing a dense sintered body having sufficient resistance to corrosion by not only a fluorine-based plasma but chloride-based plasma.

Solution to Problem

The inventors have conducted extensive investigation with a view to accomplishing the above object and, as a result, surprisingly found that a granular sintering material containing a rare earth oxyfluoride of a specific form and having a specific apparent tap density and a specific particle size, is capable of producing a sintered body having very high denseness and high resistance to corrosion by a chlorine-based plasma. The invention has been completed based on this finding.

The present invention has been accomplished based on the above finding, and provides a sintering material comprising a granule containing a rare earth oxyfluoride (Ln-O—F), and having an apparent tap density of 1.0 to 2.5 g/cm³, a 50% cumulative volume particle diameter ($D_{50N}$) of 10 to 100 μm as measured before ultrasonication by laser diffraction/scattering particle size distribution analysis, a 50% cumulative volume particle diameter ($D_{50D}$) of 0.1 to 1.5 μm as measured after ultrasonication at 300 W for 15 minutes by laser diffraction/scattering particle size distribution analysis, and an X-ray diffraction pattern in which the maximum peak observed in the 2θ angle range of from 20° to 40° is assigned to a rare earth oxyfluoride of the form LnOF when analyzed by X-ray diffractometry using Cu-Kα or Cu-Kα₁ rays.

The present invention also provides a powder used to prepare the sintering material, having a 50% cumulative volume particle diameter ($D^*_{50D}$) of 0.1 to 1.5 μm as measured after ultrasonication at 300 W for 5 minutes by laser diffraction/scattering particle size distribution analysis and an X-ray diffraction pattern in which the maximum peak observed in the 2θ angle range of from 20° to 40° is assigned to a rare earth oxyfluoride of the form LnOF in X-ray diffractometry using Cu—Kα or Cu—Kα$_1$ rays (hereinafter also referred to as the powder of the present invention).

The present invention also provides a method comprising using a granule containing a rare earth oxyfluoride (Ln-O—F) as a raw material of a sintered body, the granule having an apparent tap density of 1.0 to 2.5 g/cm$^3$, a 50% cumulative volume particle diameter (D$_{50N}$) of 10 to 100 μm as measured before ultrasonication by laser diffraction/scattering particle size distribution analysis, a 50% cumulative volume particle diameter (D$_{50D}$) of 0.1 to 1.5 μm as measured after ultrasonication at 300 W for 15 minutes by laser diffraction/scattering particle size distribution analysis, and an X-ray diffraction pattern in which the maximum peak observed in the 2θ angle range of from 20° to 40° is assigned to a rare earth oxyfluoride of the form LnOF when analyzed by X-ray diffractometry using Cu—Kα or Cu—Kα$_1$ rays.

The present invention also provides a method for producing a sintered body, comprising using a granule containing a rare earth oxyfluoride (Ln-O—F), the granule having an apparent tap density of 1.0 to 2.5 g/cm$^3$, a 50% cumulative volume particle diameter (D$_{50N}$) of 10 to 100 μm as measured before ultrasonication by laser diffraction/scattering particle size distribution analysis, a 50% cumulative volume particle diameter (D$_{50D}$) of 0.1 to 1.5 μm as measured after ultrasonication at 300 W for 15 minutes by laser diffraction/scattering particle size distribution analysis, and an X-ray diffraction pattern in which the maximum peak observed in the 2θ angle range of from 20° to 40° is assigned to a rare earth oxyfluoride of the form LnOF when analyzed by X-ray diffractometry using Cu—Kα or Cu—Kα$_1$ rays.

Advantageous Effects of Invention

The sintering material of the invention can be used to produce a dense and uniform sintered body that is highly resistant to corrosion by not only a fluorine-based plasma but chlorine-based plasma and is less prone to particle shedding.

It is easy with the powder of the invention to prepare the sintering material of the invention.

DESCRIPTION OF EMBODIMENTS

The invention will be described on the basis of preferred embodiments.
I. Sintering Material of the Invention (Hereinafter Also Referred Simply to "the Material of the Invention") Will be Described Below.
(1) Rare Earth Oxyfluoride The sintering material of the invention is characterized by containing a rare earth oxyfluoride (hereinafter also referred to as Ln-O—F). The rare earth oxyfluoride (Ln-O—F) in the invention is a compound composed of a rare earth element (Ln), oxygen (O), and fluorine (F). It is necessary for the Ln-O—F to contain as a main component a compound having a ratio between a rare earth element (Ln), oxygen (O), and fluorine (F), Ln:O:F molar ratio, of 1:1:1, i.e., a rare earth oxyfluoride of the form LnOF. The sintering material of the invention may further contain a rare earth oxyfluoride of other forms, such as Ln$_5$O$_4$F$_7$, Ln$_5$O$_6$F$_7$, Ln$_7$O$_6$F$_9$, Ln$_4$O$_6$F$_9$, Ln$_4$O$_3$F$_6$, Ln$_6$O$_5$F$_8$, Ln$_{17}$O$_{14}$F$_{23}$, and (LnO$_{0.826}$F$_{0.17}$)F$_{1.174}$.

Rare earth elements (Ln) include 16 elements: scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). The sintering material of the invention contains at least one of the 16 rare earth elements. To further enhance the heat resistance, wear resistance, and corrosion resistance of the sintered body obtained by using the sintering material according to the process hereinafter described, it is preferred to use, among these elements, at least one of yttrium (Y), cerium (Ce), samarium (Sm), gadolinium (Gd), dysprosium (Dy), erbium (Er), and ytterbium (Yb), particularly yttrium (Y).

When the sintering material of the invention is analyzed by X-ray diffractometry using Cu—Kα or Cu—Kα$_1$ rays, the maximum peak observed in the 2θ angle range of from 20° to 40° is assigned to a rare earth oxyfluoride of the form LnOF. When the maximum peak observed in that range is a peak assigned to a rare earth oxyfluoride of the form LnOF, a dense sintered body is obtained easily. The sintering material the maximum peak of which is assigned to a rare earth oxyfluoride of the form LnOF can be obtained by, for example, selecting properly the mixing ratio in step 1 and the firing conditions in step 2 in the hereinafter described process for preparing the sintering material. In the case when the rare earth element is yttrium (Y), the maximum peak of yttrium oxyfluoride of the form YOF appears at a 2θ angle of from 28.5° to 29.0°.

Ln$_7$O$_6$F$_9$, Ln$_4$O$_3$F$_6$, and the like are not produced by ordinary processes. Usually obtainable rare earth oxyfluorides are LnOF and Ln$_5$O$_4$F$_7$. Therefore, Ln$_5$O$_4$F$_7$ will be described as a representative of rare earth oxyfluorides of the form other than LnOF.

When the sintering material in which the rare earth element is yttrium, for example, is analyzed by X-ray diffractometry using Cu—Kα or Cu—Kα$_1$ rays, it is preferred that a ratio of the intensity (S$_2$) of the peak assigned to yttrium oxyfluoride of the form Y$_5$O$_4$F$_7$ in the 2θ angle range of from 31.8° to 32.8° to the intensity (S$_1$) of the maximum peak assigned to yttrium oxyfluoride of the form YOF in the 2θ angle range of from 20° to 40°, S$_2$/S$_1$, be 0.2 or smaller. When the S$_2$/S$_1$ is 0.2 or smaller, a denser sintered body is obtained easily. The S$_2$/S$_1$ is more preferably 0.15 or smaller, even more preferably 0.1 or smaller. The S$_2$/S$_1$ is most preferably 0, that is, it is particularly preferred that no peaks assigned to the rare earth oxyfluoride of the form Y$_5$O$_4$F$_7$ be observed. The sintering material having the S$_2$/S$_1$ at or below the above recited upper limit can be obtained by, for example, selecting properly the mixing ratio in step 1 and the firing conditions in step 2 in the hereinafter described process for producing the sintering material.
(2) Rare Earth Oxide It is preferred for the material of the invention not to contain, or to contain as little as possible, Ln$_x$O$_y$, that is an oxide of a rare earth element alone in view of anti-corrosion properties, particularly resistance to a chlorine-containing gas, of the sintered body. The Ln$_x$O$_y$ content in the sintering material of the invention can be minimized by, for example, selecting properly the mixing ratio in step 1 and the firing conditions in step 2 in the hereinafter described process for producing the sintering material.

When the sintering material of the invention in which the rare earth element is yttrium, for example, is analyzed by X-ray diffractometry using Cu—Kα or Cu—Kα$_1$ rays, it is preferred that the ratio of the peak intensity (S$_0$) of yttrium oxide observed in the 2θ angle range of from 20.1° to 21.0° to the maximum peak intensity (S$_1$) of yttrium oxyfluoride of the form YOF observed in the 2θ angle range of from 20° to 40°, S$_0$/S$_1$, be 0.1 or less, more preferably 0.08 or less, even more preferably 0.05 or less. The smaller the S$_0$/S$_1$, the more desired the sintering material. The S$_0$/S$_1$ is most preferably 0, that is, it is particularly preferred that no peaks assigned to yttrium oxide ($Y_2O_3$) be observed. When the $S_0/S_1$ is 0.1 or smaller, the sintered body obtained from the sintering material of the invention exhibits high resistance to corrosion by not only a fluorine-based but chlorine-based plasma.

In saying that the $S_0/S_1$ and $S_2/S_1$ should be within the specific ranges described above in X-ray diffractometry using Cu—Kα or Cu—Kα$_1$ rays, it is only necessary that the requirement be satisfied in X-ray diffractometry using either Cu—Kα rays or Cu—Kα$_1$ rays. It does not mean that these values should be in their respective specified ranges in both X-ray diffractometry using Cu—Kα rays and X-ray diffractometry using Cu—Kα$_1$ rays. Note that, however, because both the values $S_0/S_1$ and $S_2/S_1$ do not substantially vary depending on which of Cu—Kα rays and Cu—Kα$_1$ rays are used, it does not matter which X-rays are used unless these values are extremely close to the boundary values of the above ranges. X-Ray diffractometry for obtaining $S_0$, $S_1$, and $S_2$ is carried out under the conditions described in Examples given later. X-Ray diffractometry adopted in the invention is powder X-ray diffractometry.

In general, a rare earth oxide ($Ln_xO_y$), when produced by firing an oxalate or a carbonate in the air, is a sesquioxide $Ln_2O_3$ (x=2 and y=3), except for cerium (Ce), praseodymium (Pr), and terbium (Tb). A cerium oxide is usually obtained as $CeO_2$ (x=1 and y=2), a praseodymium oxide is usually obtained as $Pr_6O_{11}$ (x=6 and y=11), and a terbium oxide is usually obtained as $Tb_4O_7$ (x=4 and y=7). Oxides of other forms, such as $Ce_2O_3$, $Pr_2O_3$, $PrO_2$, and EuO, could be produced under specific conditions but are converted to the above described general forms when allowed to stand in the air. Therefore, the above described general oxide forms are preferred.

(3) Average Particle Size ($D_{50N}$) of Sintering Material Measured Before Ultrasonication The sintering material of the invention, which contains an oxyfluoride of the form LnOF, has an average particle size of 10 to 100 μm as measured before the sintering material is ultrasonicated. Having an average particle size of 10 μm or greater, the sintering material is capable of forming a dense and uniform sintered body. Having an average particle size of 100 μm or smaller, the sintering material is capable of forming a dense sintered body that is less prone to cracking. From these viewpoints, the average particle size of the sintering material containing an oxyfluoride of the form LnOF measured before ultrasonication is preferably 12 to 90 μm, more preferably 15 to 80 μm. As used herein, the average particle size of the sintering material containing an oxyfluoride of the form LnOF as measured before ultrasonication is a diameter at 50% cumulative volume in the particle size distribution (hereinafter also referred to as $D_{50N}$).

Since the measurement of $D_{50N}$ is taken without subjecting the sample granules to ultrasonication, the average particle size ($D_{50N}$) of the granules is obtained without destroying the granules.

(4) Average Particle Size ($D_{50D}$) of Sintering Material Measured After Ultrasonication The sintering material of the invention, which contains an oxyfluoride of the form LnOF, has an average particle size of 0.1 to 1.5 μm as measured after the material is ultrasonicated at 300 W for 15 minutes. Having an average particle size of 0.1 μm or greater, the sintering material is capable of forming a dense and uniform sintered body. Having an average particle size of 1.5 μm or smaller, the sintering material is capable of forming a dense sintered body that is less prone to cracking. From these viewpoints, the average particle size of the sintering material containing an oxyfluoride of the form LnOF measured after ultrasonication is preferably 0.2 to 1.2 μm, more preferably 0.3 to 1.0 μm. As used herein, the average particle size of the sintering material containing an oxyfluoride of the form LnOF as measured after ultrasonication is a diameter at 50% cumulative volume in the particle size distribution (hereinafter also referred to as $D_{50D}$).

While ultrasonication at an output power of 300 W is usually carried out for about 5 minutes, the ultrasonication preceding the measurement of the $D_{50D}$ in the invention is carried out for as long as 15 minutes so that the granular sintering material may be broken completely so as to measure the average particle size $D_{50D}$ of the particles composing the granules.

The $D_{50N}$ and $D_{50D}$ can be determined by laser diffraction/scattering particle size distribution analysis. Details of the $D_{50N}$ and $D_{50D}$ measurement will be described later. In carrying out laser diffraction/scattering particle size distribution analysis, the sintering material is not ultrasonicated before the analysis for the measurement of $D_{50N}$, while the sintering material is ultrasonicated at 300 W for 15 minutes before the analysis for the measurement of $D_{50D}$.

The sintering material the $D_{50N}$ of which is in the range recited can be obtained by properly selecting the spray drying conditions in step 4 of the hereinafter described process for producing the sintering material of the invention.

The sintering material the $D_{50D}$ of which is in the range recited can be obtained by properly selecting the grinding conditions in step 3 of the hereinafter described process for producing the sintering material of the invention.

(5) Apparent Tap Density (TD)

The sintering material of the invention should have an apparent tap density of 1.0 to 2.5 g/cm$^3$. The sintering material with the apparent tap density falling within that range provides a dense sintered body. The apparent tap density is preferably 1.1 to 2.3 g/cm$^3$, more preferably 1.2 to 2.0 g/cm$^3$, in terms of denseness of the sintered body.

The apparent tap density can be measured using Multitester MT-1001 from Seishin Enterprise Co., Ltd. and the cell provided for measuring compressibility. The sintering material having the apparent tap density within the range recited can be obtained by properly selecting the firing conditions in step 2 of the hereinafter described process for producing the sintering material.

(6) Organic Polymer Binder

The sintering material of the invention preferably contains an organic polymer binder to have improved formability.

A preferred content of an organic polymer binder in the sintering material is such that the sintering material may have a carbon (C) content of 0.1 to 3 mass %. With the recited carbon (C) content, the sintering material has improved formability to provide a dense sintered body. From this viewpoint, the carbon (C) content in the sintering material is more preferably 0.2 to 2.5 mass %. The carbon content of the sintering material can be estimated by an infrared absorption method after combustion in an oxygen stream, called a combustion/IR absorption method.

The organic polymer binder preferably contains at least one of a hydroxy group, a carbonyl group, and an ether linkage. Examples of useful organic polymer binders include polyvinyl alcohol, polyvinyl butyral, methyl cellulose, carboxymethyl cellulose, acrylic binders containing a carboxyl group or a derivative thereof in the molecule, polyethylene glycol, and polyvinylpyrrolidone.

(7) O/Ln Molar Ratio

The sintering material of the invention preferably has a molar ratio of oxygen element (O) to rare earth element (Ln) per kg of the material, O/Ln molar ratio, of 0.85 to 1.10. With the O/Ln molar ratio being in that range, the resulting sintered body exhibits further improved resistance to corrosion by a chlorine-based plasma, and the sintering material easily provides a sintered body that is denser, more uniform, and less liable to particle shedding during plasma etching. To ensure these effects, the O/Ln molar ratio is more preferably 0.87 to 1.08, even more preferably 0.90 to 1.05.

The O/Ln molar ratio is calculated from the oxygen content of the sintering material determined by inert gas fusion-IR absorption method and the rare earth content of the material determined by acid digestion/ICP-AES. The O/Ln molar ratio can be adjusted to be in the above range by properly selecting the mixing ratio in step 1, the firing conditions in step 2, and so on in the hereinafter described process for production.

(8) Loss-on-Drying

When dried at 120° C. for 1 hour, the sintering material of the invention preferably has a loss-on-drying of 0.1 to 1.0 mass %. With the loss-on-drying falling within that range, the sintering material is easily formed into a green body that does not easily crumble, and when fired to be sintered, the green body generates a reduced amount of water vapor thereby to reduce pore formation due to water vapor escape. Consequently, the resulting sintered body is denser and more uniform and less prone to particle shedding during plasma etching. From the above viewpoint, the loss-on-drying is preferably 0.15 to 0.9 mass %, more preferably 0.2 to 0.8 mass %. The loss-on-drying can be determined by the method described in Examples given later. The loss-on-drying can be adjusted to the recited range by properly selecting the firing conditions in step 2 and the like in the hereinafter described process of production.

II. Powder for Preparing Sintering Material (1) Rare Earth Oxyfluoride

The powder of the invention is characterized by containing a rare earth oxyfluoride (Ln-O—F). The Ln-O—F should contain as a main component a compound having a molar ratio between a rare earth element (Ln), oxygen (O), and fluorine (F), Ln:O:F molar ratio, of 1:1:1, i.e., a rare earth oxyfluoride having the LnOF form. The powder of the invention may further contain a rare earth oxyfluoride of other forms, such as $Ln_5O_4F_7$, $Ln_7O_6F_9$, and $Ln_4O_3F_6$.

The powder of the invention contains at least one of the 16 rare earth elements listed supra. To further enhance the heat resistance, wear resistance, and corrosion resistance of the sintered body obtained by using the sintering material according to the process hereinafter described, it is preferred to use at least one of yttrium (Y), cerium (Ce), samarium (Sm), gadolinium (Gd), dysprosium (Dy), erbium (Er), and ytterbium (Yb), particularly yttrium (Y), among the 16 rare earth elements listed supra.

When the powder of the invention is analyzed by X-ray diffractometry using Cu—Kα or Cu—Kα$_1$ rays, the maximum peak observed in the 2θ angle range of from 20° to 40° is a peak assigned to a rare earth oxyfluoride of the form LnOF. When the maximum peak in that range is assigned to a rare earth oxyfluoride of the form LnOF, a dense sintered body is obtained easily. In the case when the rare earth element is yttrium (Y), the maximum peak of yttrium oxyfluoride of the form YOF appears at a 2θ angle ranging from 28.5° to 29.0°.

When the powder of the invention in which the rare earth element is yttrium, for example, is analyzed by X-ray diffractometry using Cu—Kα or Cu—Kα$_1$ rays, it is preferred that a ratio of the peak intensity ($S_2$) assigned to yttrium oxyfluoride of the form $Y_5O_4F_7$ in the 2θ angle range of from 31.8° to 32.8° to the maximum peak intensity ($S_1$) assigned to yttrium oxyfluoride of the form YOF in the 2θ angle range of from 20° to 40°, $S_2/S_1$, be 0.2 or smaller. When the $S_2/S_1$ is 0.2 or smaller, a denser sintered body is obtained easily. The $S_2/S_1$ is more preferably 0.15 or smaller, even more preferably 0.1 or smaller. The $S_2/S_1$ is most preferably 0.

(2) Rare Earth Oxide

It is preferred for the powder of the invention not to contain, or to contain as little as possible, $Ln_xO_y$ that is an oxide of a rare earth element alone in view of anti-corrosion properties, particularly resistance to a chlorine-containing gas, of the sintered body. The $Ln_xO_y$ content in the powder of the invention can be minimized by, for example, selecting properly the mixing ratio in step 1 and the firing conditions in step 2 in the hereinafter described process for producing the powder of the invention (the process for producing the sintering material).

When the powder of the invention in which the rare earth element is yttrium, for example, is analyzed by X-ray diffractometry using Cu—Kα or Cu—Kα$_1$ rays, it is preferred that the ratio of the peak intensity ($S_0$) of yttrium oxide observed in the 2θ angle range of from 20.1° to 21.0° to the maximum peak intensity ($S_1$) of yttrium oxyfluoride of the form YOF observed in the 2θ angle range of from 20° to 40°, $S_0/S_1$, be 0.1 or smaller, more preferably 0.08 or smaller, even more preferably 0.05 or smaller. The smaller the $S_0/S_1$, the more desirable. The $S_0/S_1$ is most preferably 0.

The description of the material of the invention under Section I-(1) titled "Rare Earth Oxyfluoride" and Section I-(2) titled "Rare Earth Oxide" applies equally to the powder of the invention.

(3) Average Particle Size ($D^*_{50D}$) of Powder Measured after Ultrasonication The powder of the invention, which contains an oxyfluoride of the form LnOF, has an average particle size of 0.1 to 1.5 μm as measured after it is ultrasonicated at 300 W for 5 minutes. Having an average particle size of 0.1 μm or greater, the powder of the invention is capable of forming a dense and uniform sintered body. Having an average particle size of 1.5 μm or smaller, the powder is capable of forming a dense sintered body that is less prone to cracking. From these viewpoints, the average particle size of the powder containing an oxyfluoride of the form LnOF measured after ultrasonication is preferably 0.2 to 1.2 μm, more preferably 0.3 to 1.0 μm. As used herein, the average particle size of the powder containing an oxyfluoride of the form LnOF as measured after ultrasonication is a diameter at 50% cumulative volume in the particle size distribution (hereinafter also referred to as $D^*_{50D}$).

Unlike the ultrasonication of the sintering material, the ultrasonication of the powder (at 300 W) is carried out for 5 minutes. For the powder, there is no need to destroy granules, and it is only necessary to disintegrate agglomerates. Thus, five-minute ultrasonication is enough to disperse the agglomerated powder.

(4) O/Ln Molar Ratio

The powder for preparing the sintering material of the invention preferably has a molar ratio of oxygen element (O) to rare earth element (Ln) per kg of the powder, O/Ln molar ratio, of 0.85 to 1.10. With the O/Ln molar ratio being in that range, the resulting sintered body exhibits further improved resistance to corrosion by a chlorine-based plasma, and the sintered body is denser, more uniform, and less liable to particle shedding during plasma etching. To ensure these effects, the O/Ln molar ratio is more preferably 0.87 to 1.08, even more preferably 0.90 to 1.05.

The O/Ln molar ratio is calculated from the oxygen content of the powder determined by inert gas fusion-IR absorption method and the rare earth content of the powder determined by acid digestion/ICP-AES.

(5) The powder of the invention preferably has a carbon (C) content of 0.2 mass % or less, particularly 0.1 mass % or less, in view of minimizing the carbon content of the sintering material of the invention prepared using the powder of the invention. The carbon content of the powder can be determined in the same manner as for the carbon content of the material of the invention. The powder having the carbon content within the above range can be obtained by using as starting materials a rare earth oxide and a rare earth fluoride both having a carbon (C) content of not more than 0.3 mass %. It is easy to choose a rare earth oxide and a rare earth fluoride having a carbon (C) content of not more than 0.3 mass %.

III. Process of Production (1) Process for Producing Sintering Material

A preferred process for producing the sintering material of the invention will then be described. The process includes the following four steps, which will be described in sequence:

step 1: mixing a rare earth oxide ($Ln_xO_y$) or a rare earth compound capable of becoming an oxide on firing (hereinafter also referred to as a rare earth oxide precursor) and a rare earth fluoride ($LnF_3$) to prepare a mixture.

Step 2: firing the mixture obtained in step 1 to form a rare earth oxyfluoride.

Step 3: grinding the fired product obtained in step 2 to obtain a ground powder or a ground slurry.

Step 4: slurrying the ground powder of step 3 (in the case when the product of step 3 is a ground powder) to prepare a slurry, and spray drying the resulting slurry or the ground slurry obtained in step 3 to obtain granules, namely the sintering material of the invention.

Step 1:

The rare earth oxide ($Ln_xO_y$) or a rare earth compound capable of becoming an oxide on firing (a rare earth oxide precursor) to be subjected to mixing preferably has an average particle size ($D_{50}$) of 0.1 to 10 μm, more preferably 0.15 to 8 μm, even more preferably 0.2 to 7 μm.

The rare earth fluoride ($LnF_3$) to be subjected to mixing preferably has an average particle size ($D_{50}$) of greater than 5 μm and not greater than 500 μm, more preferably greater than 5 μm and not greater than 100 μm, even more preferably 5.5 to 50 μm. Measurements of the $D_{50}$ of these components are taken after ultrasonication in the same manner as described above with respect to the $D_{50D}$ of the sintering material, provided that the ultrasonication before the analysis for the measurement is carried out for 5 minutes.

When the average particle sizes ($D_{50}$) of the rare earth oxide ($Ln_xO_y$) or the rare earth oxide precursor and the rare earth fluoride ($LnF_3$) are within their respective preferred ranges described above, the labor of grinding the raw materials, particularly a rare earth fluoride that needs time and labor for grinding, is reduced while securing the reactivity in the firing of step 2. Examples of the rare earth oxide precursor include an oxalate and a carbonate of a rare earth element.

The mixing ratio is preferably such that the molar ratio of the rare earth fluoride ($LnF_3$) to a rare earth element (Ln*) of the rare earth oxide or the rare earth oxide precursor, i.e., $LnF_3$/Ln*molar ratio, is 0.35 to 0.70. At such a mixing ratio, the rare earth oxyfluoride of the form LnOF is easily formed in step 2 described below. From this standpoint, the $LnF_3$/Ln*molar ratio is more preferably 0.40 to 0.65, even more preferably 0.45 to 0.60.

Step 2:

The mixture obtained in step 1 is fired preferably at a temperature of 750° to 1400° C. When fired at a temperature within that range, a sufficient amount of the rare earth oxyfluoride of the form LnOF is produced. It is acceptable that a small amount of the rare earth oxyfluoride of the form $Ln_5O_4F_7$, a small amount of the rare earth fluoride or a small amount of the rare earth oxide remain. It should be noted, however, that, when the rare earth fluoride remains, there is a possibility that the reaction may have been insufficient.

The firing temperature is more preferably 800° to 1300° C., even more preferably 850° to 1200° C.

The firing time is preferably 1 to 72 hours, more preferably 2 to 60 hours, even more preferably 3 to 48 hours, provided that the firing temperature is in the range described above. Within the firing time range described, a rare earth oxyfluoride of the form LnOF is sufficiently produced while holding down the energy consumption.

The firing may be carried out in an oxygen-containing atmosphere, such as the air. However, when the firing temperature is 1100° C. or higher, particularly 1200° C. or higher, an inert gas atmosphere, such as argon gas, or a vacuum atmosphere is preferred, because the rare earth oxyfluoride once formed is liable to decompose to a rare earth oxide in an oxygen-containing atmosphere.

Step 3:

The grinding operation may be carried out by any of dry grinding, wet grinding, and a combination of dry grinding and wet grinding. In the case of conducting only dry grinding, a ground powder is obtained. In the case of conducting at least wet grinding, a ground slurry is obtained. In order to produce a ground product with a narrow particle size distribution, it is preferred to perform at least wet grinding. Dry grinding may be carried out using a dry ball mill, a dry bead mill, a high-speed rotor impact mill, a jet mill, a grindstone type grinder, a roll mill, an atomizer, and so forth. Wet grinding is preferably carried out in a wet grinding machine using a spherical, cylindrical, or other shaped grinding medium, such as a ball mill, a vibration mill, a bead mill, or Attritor®. The grinding is conducted to a $D_{50}$ of the ground particles of 0.1 to 1.5 μm, preferably a $D_{50}$ of 0.2 to 1.2 μm, more preferably 0.3 to 1.0 μm. The $D_{50}$ of the ground particles can be controlled by adjusting the size of the grinding medium used, the grinding time, the number of times of passages, and the like. Materials of the grinding media include zirconia, alumina, silicon nitride, silicon carbide, tungsten carbide, wear resistant steel, and stainless steel. Zirconia may be metal oxide-stabilized zirconia. The dispersion medium used in wet grinding may be one of, or a combination of two or more of, water and various organic solvents. In using an organic solvent, an organic solvent having a water solubility of 5 mass % or more or a mixture of such an organic solvent and water is preferred.

Examples of the organic solvent having a water solubility of 5 mass % or more (including a freely water-miscible one) include alcohols, ketones, cyclic ethers, formamides, and sulfoxides.

Examples of the alcohols include monohydric alcohols, such as methanol (methyl alcohol), ethanol (ethyl alcohol), 1-propanol (n-propyl alcohol), 2-propanol (isopropyl alcohol, IPA), 2-methyl-1-propanol (isobutyl alcohol), 2-methyl- 2-propanol (tert-butyl alcohol), 1-butanol (n-butyl alcohol), and 2-butanol (sec-butyl alcohol); and polyhydric alcohols, such as 1,2-ethanediol (ethylene glycol), 1,2-propanediol (propylene glycol), 1,3-propanediol (trimethylene glycol), and 1,2,3-propanetriol (glycerol).

Examples of ketones usable in the invention are propanone (acetone) and 2-butanone (methyl ethyl ketone, MEK). Examples of the cyclic ethers are tetrahydrofuran (THF) and 1,4-dioxane. Examples of the formamides include N,N-dimethylformamide (DMF). Examples of the sulfoxides include dimethyl sulfoxide (DMSO). These organic solvents may be used either individually or as a mixture thereof.

Preferred of the organic solvents having a water solubility of 5 mass % or more are alcohols. Monohydric alcohols are more preferred, with at least one of methanol, ethanol, 1-propanol, and 2-propanol being particularly preferred.

To obtain a ground product having a narrower particle size distribution, it is preferred to conduct the grinding by dry grinding followed by wet grinding or to conduct wet grinding in two or more stages, that is, a plurality of stages. When the grinding is conducted in a plurality of states, the grinding media used in the second and subsequent stages is smaller in size than those used in the preceding stage. The number of the grinding stages is preferably greater, in view of obtaining a powder having a smaller dispersion index. In view of cost and labor, however, two-stage grinding is the most preferred.

Step 4:

In the case when a ground powder is obtained in step 3, the powder is slurried. The ground powder can be slurried by mixing with the same dispersion medium as for the wet grinding in step 3. The ground powder concentration in the resulting slurry is preferably 100 to 2000 g/L, more preferably 200 to 1500 g/L. The dispersion medium to be used in slurrying may be the same as for the wet grinding described above. At a slurry concentration in that range, excessive energy consumption is avoided, and the slurry has a moderate viscosity to provide stable sprayability.

In the case when a ground slurry is obtained in step 3, the slurry can be subjected to spray drying as such. In this case, a slurry having the above specified concentration of the powder can be prepared by adjusting the ratio of the dispersion medium to the fired product in step 3 or by once obtaining a slurry having a higher concentration in step 3 and then adding the dispersion medium to adjust the concentration in this step.

The organic polymer binder that can be incorporated into the sintering material of the invention is preferably added to the slurry to be spray dried. The organic polymer binder may be added before spray drying in step 4 or may be added to the slurry obtained by the wet grinding if performed in step 3. The amount of the organic polymer binder to be added is preferably 0.2 to 7 mass %, more preferably 0.4 to 6 mass %, relative to the powder in the slurry.

The thus prepared slurry is spray dried to obtain granules, i.e., the sintering material of the invention. As a condition of spray drying, the number of rotations of the atomizer is preferably 5,000 to 30,000 $min^{-1}$. At a rotational speed of 5000 $min^{-1}$ or more, the LnOF and other solid matter are dispersed sufficiently to provide uniform granules. At a rational speed of 30,000 $min^{-1}$ or less, on the other hand, granules with an intended particle size are obtained easily. From these viewpoints, the number of rotations of the atomizer is more preferably 6,000 to 25,000 $min^{-1}$.

The inlet temperature in spray drying is preferably 150° to 300° C. At an inlet temperature of 150° C. or higher, the solid matter is sufficiently dried to give granules with not too large a residual water content. At an inlet temperature of 300° C. or lower, the residual water content of granules is prevented from becoming too small, and wasteful energy consumption is held down.

The thus obtained granules serve as the sintering material of the invention without being fired. While the granules are not fired, too large granules and/or too small granules may be removed by sieving.

The opening of the sieve to be used to remove too large granules is preferably 1.2 to 5 times, more preferably 1.5 to 4 times, the average particle size ($D^*_{50N}$) before sieving.

The opening of the sieve to be used to remove too small granules is preferably 0.2 to 0.8 times, more preferably 0.3 to 0.6 times, the average particle size ($D^*_{50N}$) before sieving. Note that, however, it is considerably difficult to achieve sieving using a sieve with an opening of 20 μm or smaller, particularly an opening of 10 μm or smaller. Therefore, it is difficult to remove too small granules when the average particle size ($D^*_{50N}$) before sieving is small.

(2) Process for Producing Powder to be Used to Produce Sintering Material

Steps 1 to 3 of the aforementioned process for producing the sintering material are carried out. When the grinding in step 3 is only dry grinding, the resulting ground powder serves as a powder for use in the production of the sintering material. When the grinding in step 3 includes wet grinding, the resulting ground slurry is dried by a drying technique that does not involve granulation like spray drying to give powder that can be used to prepare the sintering material. The drying of the ground slurry may be followed by dry disintegration to make a powder for use in the production of the sintering material.

The process for producing the sintering material of the invention from the powder for producing the sintering material of the invention can be achieved by carrying out step 4 of the above described process for producing the sintering material that starts with slurrying.

(3) Gist of Method for Making Sintered Body Containing Rare Earth Oxyfluoride of the Form LnOF from Sintering Material of Invention A sintered body containing a rare earth oxyfluoride of the form LnOF may be produced using the sintering material of the invention in accordance with any known method.

An example of known methods is a method in which the sintering material is uniaxially pressed in a mold, shaped by CIP (cold isostatic pressing) using a rubber press, and sintered by firing with no pressure applied. There is another method in which the sintering material is sintered with pressure applied, such as hot pressing or HIP (hot isostatic press) sintering.

The sintering material of the invention may be sintered in an oxygen-containing atmosphere, such as the air, but is preferably sintered in an inert gas atmosphere, such as argon gas, in order to inhibit formation of a rare earth oxide. The firing temperature is preferably 1000° to 1800° C., more preferably 1100° to 1700° C. It is preferred for the sintered body obtained by sintering the sintering material of the invention to have a relative density of 97% to 100%, more preferably 98% to 100%.

The thus obtained sintered body may be used as a part composing semiconductor manufacturing equipment, such as a vacuum chamber of an etching apparatus, a mount and a focus ring used in the vacuum chamber, an etching gas feed inlet, a shower plate, a window, and so on. The sintered body is also useful as a part composing plasma processing equipment and chemical plants.

EXAMPLES

The invention will now be illustrated in greater detail with reference to Examples, but it should be understood that the invention is not deemed to be limited thereto. Unless otherwise noted, all the percentages are by mass.

Examples 1 to 11 and Comparative Examples 1 to 4

Sintering materials were prepared according to the following steps.
(1) Step 1: Mixing
Yttrium oxide ($Y_2O_3$) fine powder available from Nippon Yttrium Co., Ltd. ($D^*_{50D}$: 0.24 μm; carbon: 0.1 mass %) and yttrium fluoride ($YF_3$) from Nippon Yttrium Co., Ltd. ($D^*_{50D}$: 7.4 μm; carbon: 0.05 mass %) were mixed at an $LnF_3/Ln^*$ molar ratio shown in Table 1 below. The step of mixing was not conducted in Comparative Example 3, in which only yttrium oxide fine powder was used, and Comparative Example 4, in which only yttrium fluoride was used.
(2) Step 2: Firing
The mixture obtained in step 1 (or the single substance in Comparative Examples 3 and 4) was put in an alumina boat and fired in an electric oven in the air at 950° C. for 8 hours.
(3) Step 3: Grinding
The fired product obtained in step 2 was dry ground in an atomizer (indicated by "A" in Table 1), mixed with an equal mass of pure water, and wet ground first in a bead mill using 0.8 mm-diameter yttria-stabilized zirconia (YSZ) balls for 4 hours and then in a bead mill using 0.4 mm-diameter YSZ balls for 3 hours to make a wet-ground slurry.
(4) Step 4: Spray-Drying
The wet-ground slurry obtained in step 3 was mixed with an acrylic binder and pure water to prepare a slurry having a concentration of 1000 g/L and a binder content of 3.5% based on the powder.
The resulting slurry was spray-dried using a spray drier (available from Ohkawara Kakohki Co., Ltd.) to make granules, i.e., the sintering material of the invention. The spray drier was operated under the following conditions.
Slurry feed rate: 300 ml/min
Atomizer rotational speed: 9000 $min^{-1}$
Inlet temperature: 200° C.
The average particle size $D_{50N}$ and $D_{50D}$ of the resulting sintering materials were determined as follows.
The apparent tap density of the sintering materials was determined by the following method.
The sintering materials were analyzed by powder X-ray diffractometry to obtain the maximum peak intensity (cps) in the 2θ angle range of from 20° to 40°, and the form of the maximum peak was identified. The relative intensity ($S_1$) of the peak assigned to yttrium oxyfluoride of the YOF form observed in the 2θ angle range of from 28.5° to 29.0°, the relative intensity ($S_2$) of the peak assigned to yttrium oxyfluoride of the $Y_5O_4F_7$ observed in the 2θ angle range of from 31.8° to 32.8°, and the relative intensity ($S_0$) of the peak assigned to yttrium oxide observed in the 2θ angle range of from 20.1° to 21.0° were calculated taking the maximum peak intensity as 100. When in Comparative Examples the maximum peak observed in the 2θ angle range of from 20° to 40° is not a peak assigned to yttrium oxyfluoride of the YOF form but to any of the maximum peak of yttrium oxide ($Y_2O_3$) observed at around 29.2°, the maximum peak of yttrium oxyfluoride of the $Y_5O_4F_7$ form observed at around 28.1°, and the maximum peak of yttrium fluoride ($YF_3$) observed at around 27.9°, $S_1$, $S_2$, and $S_0$ are all smaller than 100.

The carbon content and loss-on-drying of the sintering materials were determined by the methods described below.
The oxygen content and rare earth content of the sintering materials were determined by the methods below to obtain an O/Ln molar ratio.
The results obtained are shown in Table 2.
[Method for Measuring $D_{50N}$ and $D_{50D}$]
The sintering material was put into the chamber of the sample circulator of Microtrac 3300EXII from Nikkiso Co., Ltd. containing pure water until the instrument judged the concentration to be adequate, and $D_{50N}$ was determined.
In a 100 ml glass beaker was put a sample containing about 0.4 g of the sintering material, and pure water was added thereto as a dispersion medium to the scale of 100 ml. The beaker containing the particles and dispersion medium was set on an ultrasonic homogenizer US-300T (output power: 300 W) available from Nihonseiki Kaisha Ltd. and ultrasonicated for 15 minutes to prepare a slurry to be analyzed. The slurry was dropped into the chamber of the sample circulator of Microtrac 3300EXII from Nikkiso Co., Ltd. containing pure water until the instrument judged the concentration to be adequate, and $D_{50D}$ was determined.
The average particle size of the raw materials and the powder for preparing the sintering material were determined in the same manner as for the $D_{50D}$, except that the ultrasonication was conducted for 5 minutes. To distinguish from the $D_{50D}$, the average particle size of the raw materials and the powder was expressed by the symbol $D^*_{50D}$.
[Method for Measuring Apparent Tap Density (TD)]
The tap density was measured using Multiple Powder Properties Analyzer Multi-tester MT-1001 from Seishin Enterprise Co., Ltd. according to the constant weight method. A 100 cc tapping cell with a lid was used. The cell was tapped 200 times with a tapping stroke of 40 mm at a rate of 2 taps per second.
The apparent tap density is calculated by the following formula:

$$\text{Apparent tap density(TD) (g/cm}^3) = (W_{C+S} - W_C)/V \times 100$$

wherein $W_C$ is the weight (g) of the cell; $W_{C+S}$ is the total weight (g) of the cell and the sample; and V is the volume ($cm^3$) of the tapped sample.
[Method for Measuring X-Ray Diffraction]
Equipment: Ultima IV (from Rigaku Corp.)
Source: Cu—Kα rays
Tube voltage: 40 kV
Tube current: 40 mA
Scanning speed: 2°/min
Step size: 0.02°
Measurement range: 2θ=20° to 40°
The sample was thoroughly ground in an agate mortar before the analysis.
[Method for Determining Carbon Content]
The carbon content was determined using a carbon/sulfur analyzer EMIA-320V from HORIBA, Ltd. equipped with a halogen trap unit by the combustion/IR absorption method in an oxygen flow.
[Method for Measuring Loss-on-Drying]
A magnetic crucible thoroughly dried at 120° C. was allowed to cool in a desiccator for about 30 minutes and weighed to tenths of a milligram to obtain W1 (g). About 5 g of a sample was put in the crucible of known weight, and the crucible and contents were weighed to tenths of a milligram to obtain W2 (g). The crucible and contents were put in a dryer set at 120° C. and dried for 1 hour. After 1 hour drying, the crucible was taken out of the dryer, and allowed to cool in a desiccator for about 30 minutes. The total weight of the dried crucible and sample was weighted to tenths of a milligram to obtain W3 (g). The loss-on-drying was calculated by formula:

Loss-on-drying (mass %)=(W2−W3)/(W2−W1)×100

[Method for Determining O/Ln Molar Ratio]

The oxygen content (mass %) was determined by the inert gas fusion-IR absorption method (a halogen trap was used), and the resulting value was converted to the number of moles of oxygen per kg of the powder. The rare earth content (mass %) was determined by perchloric acid digestion/ICP-AES, and the resulting value was converted to the number of moles of the rare earth per kg of the powder. The O/Ln molar ratio was calculated by dividing the number of moles of oxygen per kg of the powder by the number of moles of the rare earth element per kg of the powder.

Each of the sintering materials obtained in Examples and Comparative Examples was formed in a mold under a pressure of 49 MPa and then compressed by cold isostatic pressing under a pressure of 294 MPa. The resulting green body was fired at 1500° C. for 2 hours in an argon atmosphere in an electric oven and spontaneously cooled to 150° C. in the oven to give a sintered body.

Evaluation of Sintered Body:

Each of the sintered bodies obtained in Examples and Comparative Examples was evaluated for denseness and tendency to cause particle contamination by measuring relative density, the number of cracks, and porosity of the sintered body and the number of particles shed from the sintered body by plasma etching by the methods described below. The results are shown in Table 3.

[Method for Determining Relative Density]

The density of the sintered body was obtained by the Archimedes' method. Separately, the sintered body was thoroughly ground in an agate mortar, and its true density was measured using a pycnometer. The relative density (%) of the sintered body relative to the true density was calculated.

[Method for Measuring the Number of Cracks]

The sintered body was cut to a 2 cm cube with a diamond wet cutter. The cut piece was buried in an epoxy resin, and a cut surface was abraded using a diamond slurry. The abraded surface was observed under an FE-SEM at a magnification of 5000. The number of cracks observed in a 10 µm square (corresponding to a 50 mm square in the magnified view at a magnification of 5000) freely chosen from the observed surface (the abraded cut surface) was counted. The sintered body was rated according to the following scale on the basis of the number of cracks.

A: No cracks are observed.
B: One or two cracks are observed.
C: Three to five cracks are observed.
D: More than five cracks are observed.

[Method for Determining Porosity]

Each sintered body was cut to a 2 cm cube with a diamond wet cutter and buried in an epoxy resin. A cut surface of the cut piece was abraded with a diamond slurry, and the abraded surface was observed under an optical microscope. The porosity (vol %) was calculated through image analysis of the optical microgram. A smaller porosity indicates higher denseness of the sintered body.

[Method for Evaluating the Number of Shed Particles]

The sintered body was machined to a length of 100 mm, a width of 100 mm, and a thickness of about 10 mm and tested for particle shedding in plasma etching. A 3-inch diameter silicon wafer was placed in the chamber before carrying out plasma etching. The number of particles having a particle size of about 0.2 µm or greater out of the particles shed from the sintered body due to the etching action and attached to the surface of the silicon wafer was counted using a magnifier. The plasma etching was conducted using a fluorine-based plasma under the following conditions:

atmosphere gas, $CHF_3$:Ar:$O_2$=80:160:100 ml/min;
RF power, 1300 W;
pressure, 4 Pa;
temperature, 60° C.; and
etching time, 100 hours.

The plasma etching using a chlorine-based plasma and counting the number of particles were also conducted in the same manner as above described, except for replacing the atmosphere gas $CHF_3$ with HCl to create a chlorine-based plasma.

Examples 12 to 17 and Comparative Examples 5 to 7

Sintering materials and sintered bodies were made in the same manner as in Example 7, except for changing the wet grinding conditions in step 3 as shown in Table 1. The resulting sintering materials and sintered bodies were evaluated in the same manner as in Example 7. The results of evaluation of the sintering materials are shown in Table 2, and those of the sintered bodies are shown in Table 3. In Examples and Comparative Examples except Comparative Examples 6 and 7, only the wet grinding time in the second stage was changed. In Comparative Examples 6 and 7, the wet grinding time in the first stage and the size of the beads used in the wet grinding in the first and second stages were also changed in addition to the wet grinding time in the second stage.

Examples 18 to 25

Sintering materials and sintered bodies were made in the same manner as in Example 7, except for changing the use of an organic polymer binder and the kind and amount of the organic polymer binder in step 4 as shown in Table 1. The resulting sintering materials and sintered bodies were evaluated in the same manner as in Example 7. The results of evaluation of the sintering materials are shown in Table 2, and those of the sintered bodies are shown in Table 3. In Table 1, PAC stands for an acrylic binder, and PVA stands for polyvinyl alcohol.

Examples 26 to 31 and Comparative Example 8 and 9

Sintering materials and sintered bodies were produced in the same manner as in Example 7, except for changing the firing temperature in step 2 as shown in Table 1 and changing the firing atmosphere in step 2 in Examples 29 to 31 and Comparative Example 9 to an argon gas atmosphere. The resulting sintering materials and sintered bodies were evaluated in the same manner as in Example 7. The results of evaluation of the sintering materials are shown in Table 2, and those of the sintered bodies are shown in Table 3.

Example 32

A sintering material and a sintered body were produced in the same manner as in Example 7, except for replacing the yttrium oxide used in step 1 with yttrium carbonate having a $D^*_{50D}$ of 6.5 μm as an oxide or an oxide precursor in step 1. The resulting sintering material and sintered body were evaluated in the same manner as in Example 7. The results of evaluation of the sintering materials are shown in Table 2, and those of the sintered bodies are shown in Table 3.

Example 33

The wet-ground slurry obtained in step 3 of Example 7 was dried in a dryer at 150° C. for 24 hours and disintegrated using an atomizer to give a powder for preparing a sintering material of the invention. Pure water and an acrylic binder were added to the powder and mixed to prepare a slurry having a concentration of 1000 g/L and a binder content of 3.5% based on the powder. The slurry was spray dried to obtain a sintering material, which was then sintered to make a sintered body to be tested, in the same manner as in Example 7. The resulting sintering material and sintered body were evaluated in the same manner as in Example 7. The results of evaluation of the sintering material are shown in Table 2, and those of the sintered body are shown in Table 3.

The powder for preparing the sintering material had a $D^*_{50D}$ of 0.60 μm and a carbon content of less than 0.05 mass % as determined under the conditions described supra and showed only a peak assigned to yttrium oxyfluoride of the YOF form in its X-ray diffraction pattern obtained under the conditions described supra.

Example 34

A sintering material and a sintered body to be tested were made in the same manner as in Example 33, except that the grinding in step 3 was performed only by dry grinding to give a powder for preparing a sintering material, which was used in step 4. The dry grinding was carried out by three passages through an atomizer and three passages through a jet mill. The resulting sintering material and sintered body were evaluated in the same manner as in Example 7. The results of evaluation of the sintering material are shown in Table 2, and those of the sintered body are shown in Table 3.

The powder for preparing the sintering material had a $D^*_{50D}$ of 0.90 μm and a carbon content of less than 0.05 mass % as determined under the conditions described supra and showed only a peak assigned to yttrium oxyfluoride of the YOF form in its X-ray diffraction pattern obtained under the conditions described supra.

Example 35

A sintering material and a sintered body to be tested were made in the same manner as in Example 7, except that not only pure water but ethanol were added to the wet-ground slurry obtained in step 3 in preparing a slurry by adding an acrylic binder and pure water in step 4. The ratio of ethanol to the total content of ethanol and pure water inclusive of the pure water added in step 3 was 15 vol %. The resulting sintering material and sintered body were evaluated in the same manner as in Example 7. The results of evaluation of the sintering material are shown in Table 2, and those of the sintered body are shown in Table 3.

Comparative Example 10

A sintering material and a sintered body to be tested were made in the same manner as in Comparative Example 5, except that the rotational speed of the atomizer of the spray dryer used in step 4 was changed to 15,000 min$^{-1}$. The resulting sintering material and sintered body were evaluated in the same manner as in Example 7. The results of evaluation of the sintering material are shown in Table 2, and those of the sintered body are shown in Table 3.

Comparative Example 11

The sintering material obtained in Example 18 was put in a alumina container and fired in the air in an electric oven at 600° C. for 12 hours to form thermal spray granules.

Thermal spray was carried out using the resulting granules as follows. A 100 mm square aluminum alloy plate was used as a substrate. The surface of the substrate was subjected to plasma thermal spraying. A powder feeder Twin-System 10-V from Plasma-Technik AG was used as a feeder for the thermal spraying material, and an F4 plasma spray gun from Sulzer Metco was used as a thermal spraying apparatus. The plasma thermal spraying was carried out using Ar/H$_2$ as plasma gases at a number of revolutions of the disk of 50%, a carrier gas flow rate of 2.5 L/min, a feed scale of 10%, an output power of 35 kW, and an apparatus-substrate spacing of 150 mm to a coating thickness of about 100 μm.

Evaluation of Thermal Spray Coating:

The thermal spray coating obtained in Comparative Example 11 was evaluated for denseness and tendency to cause particle contamination by measuring the number of cracks, porosity of the thermal spray coating, and the number of particles shed during plasma etching by the methods described below. The results are shown in Table 3.

[Method for Measuring the Number of Cracks]

The measurement was made by the same method as for measuring the number of cracks observed in a sintered body, except for replacing the 2 cm cubic sintered body with a 2 cm square specimen cut out of the thermal spray coating with a diamond wet cutter and buried in an epoxy resin.

[Method for Determining Porosity]

The porosity was determined by the same method as for determining the porosity of a sintered body, except for replacing the 2 cm cube sintered body with a 2 cm square specimen cut out of the thermal spray coating with a diamond wet cutter and buried in an epoxy resin.

[Method for Evaluating the Number of Shed Particles]

The number of shed particles was evaluated by the same method as for evaluating the number of shed particles from a sintered body, except for replacing the 100 mm (L) by 100 mm (W) by about 10 mm (T) sintered body with the thermal spray coating formed on the 100 mm square aluminum alloy plate.

TABLE 1

| | Rare Earth Element | Oxide/Oxide Precursor Kind | $D^*_{50D}$ (μm) | Fluoride $D^*_{50D}$ (μm) | $LnF_3/Ln^*$ Molar Ratio | Firing Temp. (°C) | Firing Time (h) | Dry Grinding | Wet Grinding 1st Stage Bead Diameter (mm) | Time (h) | 2nd Stage Bead Diameter (mm) | Time (h) | Organic Polymer Binder Kind | Amount (mass %) |
|---|---|---|---|---|---|---|---|---|---|---|---|---|---|---|
| Example 1 | Y | oxide | 0.24 | 7.4 | 0.70 | 950 | 8 | A | 0.8 | 4 | 0.4 | 3 | PAC | 3.5 |
| Example 2 | | | | | 0.675 | | | | | | | | | |
| Example 3 | | | | | 0.65 | | | | | | | | | |
| Example 4 | | | | | 0.625 | | | | | | | | | |
| Example 5 | | | | | 0.60 | | | | | | | | | |
| Example 6 | | | | | 0.55 | | | | | | | | | |
| Example 7 | | | | | 0.50 | | | | | | | | | |
| Example 8 | | | | | 0.45 | | | | | | | | | |
| Example 9 | | | | | 0.425 | | | | | | | | | |
| Example 10 | | | | | 0.40 | | | | | | | | | |
| Example 11 | | | | | 0.35 | | | | | | | | | |
| Comp. Ex. 1 | | | | | 0.87 | | | | | | | | | |
| Comp. Ex. 2 | | | | | 0.10 | | | | | | | | | |
| Comp. Ex. 3 | | | | — | 0 | | | | | | | | | |
| Comp. Ex. 4 | | — | — | 7.4 | ∞ | | | | | | | | | |
| Example 12 | Y | oxide | 0.24 | 7.4 | 0.50 | 950 | 8 | A | 0.8 | 4 | 0.4 | 1.5 | PAC | 3.5 |
| Example 13 | | | | | | | | | | | | 2 | | |
| Example 14 | | | | | | | | | | | | 2.5 | | |
| Example 15 | | | | | | | | | | | | 4 | | |
| Example 16 | | | | | | | | | | | | 7 | | |
| Example 17 | | | | | | | | | | | | 10 | | |
| Comp. Ex. 5 | | | | | | | | | | | | 20 | | |
| Comp. Ex. 6 | | | | | | | | | | 2 | 2 | 1.2 | 3 | | |
| Comp. Ex. 7 | | | | | | | | | 2 | 2 | 1.2 | 1 | PAC | 3.5 |
| Example 18 | Y | oxide | 0.24 | 7.4 | 0.50 | 950 | 8 | A | 0.8 | 4 | 0.4 | 3 | — | — |
| Example 19 | | | | | | | | | | | | | PAC | 0.1 |
| Example 20 | | | | | | | | | | | | | | 0.2 |
| Example 21 | | | | | | | | | | | | | | 1.0 |
| Example 22 | | | | | | | | | | | | | | 5.0 |
| Example 23 | | | | | | | | | | | | | | 7.0 |
| Example 24 | | | | | | | | | | | | | | 8.0 |
| Example 25 | | | | | | | | | | | | | PVA | 2.0 |
| Example 26 | Y | oxide | 0.24 | 7.4 | 0.50 | 750 | 8 | A | 0.8 | 4 | 0.4 | 3 | PAC | 3.5 |
| Example 27 | | | | | | 850 | | | | | | | | |
| Example 28 | | | | | | 1050 | | | | | | | | |
| Example 29 | | | | | | 1150 | | | | | | | | |
| Example 30 | | | | | | 1250 | | | | | | | | |
| Example 31 | | | | | | 1400 | | | | | | | | |
| Comp. Ex. 8 | | | | | | 650 | | | | | | | | |
| Comp. Ex. 9 | | | | | | 1450 | | | | | | | | |
| Example 32 | Y | carbonate | 6.5 | 7.4 | 0.50 | 950 | 8 | A | 0.8 | 4 | 0.4 | 3 | PAC | 3.5 |
| Example 33 | Y | oxide | 0.24 | 7.4 | 0.50 | 950 | 8 | A | 0.8 | 4 | 0.4 | 3 | PAC | 3.5 |
| Example 34 | Y | oxide | | | | | | A + J | — | — | — | — | — | — |
| Example 35 | Y | oxide | 0.24 | 7.4 | 0.50 | 950 | 8 | A | 0.8 | 4 | 0.4 | 3 | PAC | 3.5 |
| Comp. Ex. 10 | Y | oxide | 0.24 | 7.4 | 0.50 | 950 | 8 | A | 0.8 | 4 | 0.4 | 20 | PAC | 3.5 |
| Comp. Ex. 11 | Y | oxide | 0.24 | 7.4 | 0.50 | 950 | 8 | A | 0.8 | 4 | 0.4 | 3 | — | — |

Dry grinding) A: atomizer, A + J: three passages in an atomizer plus three passages in a jet mill
Organic polymer binder) PAC: acrylic binder, PVA: polyvinyl alcohol.

TABLE 2

| | Sintering Material (granules) (Thermal Spray Granules in Comp. Example 11) | | | | | | | | | | |
|---|---|---|---|---|---|---|---|---|---|---|---|
| | Apparent Tap Density (g/cm³) | Average Particle Size (μm) | | X-Ray Diffraction Peaks and Peak Intensity Ratio | | | | | | Loss on Drying (mass %) | Carbon Content (mass %) | O/Ln Molar Ratio |
| | | $D_{50N}$ | $D_{50D}$ | Maximum Peak Assignment | $Ln_5O_4F_7$ (S2) | LnOF (S1) | $Ln_xO_y$ (S0) | S0/S1 | S2/S1 | | | |
| Example 1 | 1.4 | 50 | 0.55 | YOF | 21 | 100 | 0 | 0 | 0.21 | 0.5 | 1.8 | 0.89 |
| Example 2 | 1.5 | 48 | 0.59 | | 15 | 100 | 0 | 0 | 0.15 | 0.5 | 1.7 | 0.90 |
| Example 3 | 1.6 | 51 | 0.56 | | 9 | 100 | 0 | 0 | 0.09 | 0.4 | 1.7 | 0.91 |
| Example 4 | 1.7 | 48 | 0.53 | | 5 | 100 | 0 | 0 | 0.05 | 0.5 | 1.8 | 0.92 |

TABLE 2-continued

Sintering Material (granules) (Thermal Spray Granules in Comp. Example 11)

| | Apparent Tap Density (g/cm³) | Average Particle Size (μm) | | Maximum Peak Assignment | X-Ray Diffraction Peaks and Peak Intensity Ratio | | | | | Loss on Drying (mass %) | Carbon Content (mass %) | O/Ln Molar Ratio |
|---|---|---|---|---|---|---|---|---|---|---|---|---|
| | | $D_{50N}$ | $D_{50D}$ | | $Ln_5O_4F_7$ (S2) | LnOF (S1) | $Ln_xO_y$ (S0) | S0/S1 | S2/S1 | | | |
| Example 5 | 1.7 | 50 | 0.54 | | 0 | 100 | 0 | 0 | 0 | 0.5 | 1.8 | 0.94 |
| Example 6 | 1.8 | 49 | 0.55 | | 0 | 100 | 0 | 0 | 0 | 0.4 | 1.6 | 0.98 |
| Example 7 | 1.8 | 47 | 0.58 | | 0 | 100 | 0 | 0 | 0 | 0.6 | 1.6 | 1.02 |
| Example 8 | 1.7 | 48 | 0.62 | | 0 | 100 | 1 | 0.01 | 0 | 0.5 | 1.8 | 1.06 |
| Example 9 | 1.7 | 51 | 0.57 | | 0 | 100 | 4 | 0.04 | 0 | 0.5 | 1.7 | 1.08 |
| Example 10 | 1.6 | 49 | 0.60 | | 0 | 100 | 8 | 0.08 | 0 | 0.5 | 1.8 | 1.11 |
| Example 11 | 1.5 | 49 | 0.59 | | 0 | 100 | 12 | 0.12 | 0 | 0.4 | 1.7 | 1.15 |
| Comp. Ex. 1 | 1.3 | 47 | 0.61 | $Y_5O_4F_7$ | 25 | 0 | 0 | — | — | 0.5 | 1.8 | 0.80 |
| Comp. Ex. 2 | 1.2 | 46 | 0.56 | $Y_2O_3$ | 0 | 74 | 16 | 0.22 | 0 | 0.6 | 1.8 | 1.37 |
| Comp. Ex. 3 | 1.3 | 48 | 0.57 | $Y_2O_3$ | 0 | 0 | 17 | — | — | 0.5 | 1.7 | 1.48 |
| Comp. Ex. 4 | 1.4 | 50 | 0.59 | $YF_3$ | 0 | 0 | 0 | — | — | 0.4 | 1.6 | 0.01 |
| Example 12 | 1.3 | 72 | 1.5 | YOF | 0 | 100 | 0 | 0 | 0 | 0.5 | 1.8 | 0.99 |
| Example 13 | 1.5 | 65 | 1.2 | | 0 | 100 | 0 | 0 | 0 | 0.3 | 1.6 | 1.00 |
| Example 14 | 1.6 | 55 | 0.82 | | 0 | 100 | 0 | 0 | 0 | 0.4 | 1.6 | 1.00 |
| Example 15 | 2.2 | 41 | 0.36 | | 0 | 100 | 0 | 0 | 0 | 0.5 | 1.8 | 1.01 |
| Example 16 | 1.7 | 34 | 0.21 | | 0 | 100 | 0 | 0 | 0 | 0.6 | 1.7 | 1.02 |
| Example 17 | 1.4 | 28 | 0.12 | | 0 | 100 | 0 | 0 | 0 | 0.6 | 1.7 | 1.01 |
| Comp. Ex. 5 | 0.9 | 25 | 0.041 | | 0 | 100 | 0 | 0 | 0 | 0.8 | 1.8 | 1.02 |
| Comp. Ex. 6 | 1.2 | 88 | 2.0 | | 0 | 100 | 0 | 0 | 0 | 0.3 | 1.7 | 1.00 |
| Comp. Ex. 7 | 1.1 | 110 | 3.50 | YOF | 0 | 100 | 0 | 0 | 0 | 0.3 | 1.7 | 1.01 |
| Example 18 | 1.2 | 40 | 0.55 | YOF | 0 | 100 | 0 | 0 | 0 | 0.4 | <0.05 | 1.01 |
| Example 19 | 1.4 | 42 | 0.55 | | 0 | 100 | 0 | 0 | 0 | 0.5 | 0.05 | 1.02 |
| Example 20 | 1.5 | 42 | 0.56 | | 0 | 100 | 0 | 0 | 0 | 0.6 | 0.09 | 1.01 |
| Example 21 | 1.7 | 45 | 0.57 | | 0 | 100 | 0 | 0 | 0 | 0.6 | 047 | 1.02 |
| Example 22 | 2.0 | 47 | 0.58 | | 0 | 100 | 0 | 0 | 0 | 0.7 | 2.1 | 1.00 |
| Example 23 | 2.2 | 48 | 0.58 | | 0 | 100 | 0 | 0 | 0 | 0.7 | 3.3 | 1.00 |
| Example 24 | 2.5 | 52 | 0.59 | | 0 | 100 | 0 | 0 | 0 | 0.8 | 3.7 | 1.02 |
| Example 25 | 1.7 | 44 | 0.58 | | 0 | 100 | 0 | 0 | 0 | 0.5 | 0.10 | 1.01 |
| Example 26 | 1.2 | 50 | 0.25 | YOF | 0 | 100 | 0 | 0 | 0 | 0.9 | 1.7 | 0.99 |
| Example 27 | 1.4 | 46 | 0.37 | | 0 | 100 | 0 | 0 | 0 | 0.7 | 1.6 | 1.01 |
| Example 28 | 1.8 | 45 | 0.78 | | 0 | 100 | 0 | 0 | 0 | 0.5 | 1.7 | 1.02 |
| Example 29 | 1.9 | 42 | 0.99 | | 0 | 100 | 0 | 0 | 0 | 0.4 | 1.6 | 1.02 |
| Example 30 | 2.1 | 40 | 1.22 | | 0 | 100 | 0 | 0 | 0 | 0.4 | 1.8 | 1.01 |
| Example 31 | 2.4 | 46 | 1.46 | | 0 | 100 | 1 | 0.01 | 0 | 0.3 | 1.8 | 1.03 |
| Comp. Ex. 8 | 0.7 | 52 | 0.12 | | 0 | 100 | 0 | 0 | 0 | 1.2 | 1.7 | 0.98 |
| Comp. Ex. 9 | 3.0 | 55 | 1.95 | | 0 | 100 | 5 | 0.05 | 0 | 0.3 | 1.8 | 1.06 |
| Example 32 | 1.7 | 45 | 0.56 | YOF | 0 | 100 | 0 | 0 | 0 | 0.5 | 1.6 | 1.00 |
| Example 33 | 1.7 | 49 | 0.60 | YOF | 0 | 100 | 0 | 0 | 0 | 0.6 | 1.6 | 1.01 |
| Example 34 | 1.6 | 53 | 0.89 | | 0 | 100 | 0 | 0 | 0 | 0.4 | 1.6 | 0.99 |
| Example 35 | 1.9 | 45 | 0.57 | YOF | 0 | 100 | 0 | 0 | 0 | 0.5 | 2.6 | 1.00 |
| Comp. Ex. 10 | 0.9 | 8.3 | 0.040 | YOF | 0 | 100 | 0 | 0 | 0 | 0.5 | 1.7 | 0.99 |
| Comp. Ex. 11 | 1.5 | 50 | 0.65 | YOF | 0 | 100 | 0 | 0 | 0 | 0.4 | <0.05 | 1.04 |

TABLE 3

Evaluation of Sintered Body (Evaluation of Thermal Spray Coating in Comp. Example 11)

| | Relative Density (%) | Cracking | Porosity (vol %) | Number of Particles | |
|---|---|---|---|---|---|
| | | | | F-based Plasma | Cl-based Plasma |
| Example 1 | 97 | A | 0.15 | 4 | 4 |
| Example 2 | 97 | A | 0.09 | 4 | 2 |
| Example 3 | 97 | A | 0.03 | 3 | 3 |
| Example 4 | 98 | A | <0.03 | 3 | 3 |
| Example 5 | 98 | A | <0.03 | 2 | 2 |
| Example 6 | 99 | A | <0.03 | 2 | 0 |
| Example 7 | 99 | A | <0.03 | 0 | 2 |
| Example 8 | 98 | A | <0.03 | 2 | 3 |
| Example 9 | 98 | A | <0.03 | 2 | 5 |
| Example 10 | 97 | A | 0.04 | 3 | 7 |
| Example 11 | 97 | B | 0.08 | 3 | 10 |
| Comp. Ex. 1 | 92 | B | 1.8 | 19 | 25 |
| Comp. Ex. 2 | 96 | B | 1.2 | 17 | 85 |
| Comp. Ex. 3 | 95 | B | 1.5 | 50 | >200 |
| Comp. Ex. 4 | 82 | B | 4.3 | 29 | 35 |
| Example 12 | 97 | B | 0.12 | 4 | 4 |
| Example 13 | 98 | A | <0.03 | 3 | 4 |
| Example 14 | 98 | A | <0.03 | 2 | 3 |
| Example 15 | 99 | A | <0.03 | 0 | 1 |
| Example 16 | 99 | A | <0.03 | 2 | 0 |
| Example 17 | 98 | B | <0.03 | 0 | 2 |
| Comp. Ex. 5 | 93 | C | 2.3 | 19 | 25 |
| Comp. Ex. 6 | 89 | D | 3.7 | 23 | 35 |
| Comp. Ex. 7 | 85 | D | 5.2 | 19 | 28 |
| Example 18 | 97 | B | 0.09 | 5 | 4 |
| Example 19 | 98 | A | <0.03 | 4 | 4 |
| Example 20 | 98 | A | <0.03 | 3 | 3 |
| Example 21 | 99 | A | <0.03 | 2 | 3 |

TABLE 3-continued

| | Evaluation of Sintered Body (Evaluation of Thermal Spray Coating in Comp. Example 11) | | | | |
|---|---|---|---|---|---|
| | Relative Density (%) | Cracking | Porosity (vol %) | Number of Particles | |
| | | | | F-based Plasma | Cl-based Plasma |
| Example 22 | 99 | A | <0.03 | 2 | 0 |
| Example 23 | 98 | B | <0.03 | 0 | 2 |
| Example 24 | 97 | B | 0.10 | 3 | 3 |
| Example 25 | 99 | A | <0.03 | 4 | 5 |
| Example 26 | 97 | A | 0.12 | 6 | 4 |
| Example 27 | 98 | A | <0.03 | 3 | 4 |
| Example 28 | 99 | A | <0.03 | 2 | 3 |
| Example 29 | 99 | A | <0.03 | 0 | 2 |
| Example 30 | 98 | A | <0.03 | 2 | 3 |
| Example 31 | 97 | A | 0.07 | 4 | 3 |
| Comp. Ex. 8 | 91 | B | 2.5 | 35 | 26 |
| Comp. Ex. 9 | 92 | D | 1.2 | 19 | 21 |
| Example 32 | 99 | A | <0.03 | 0 | 2 |
| Example 33 | 99 | A | <0.03 | 2 | 2 |
| Example 34 | 97 | A | 0.14 | 5 | 4 |
| Example 35 | 99 | A | <0.03 | 2 | 0 |
| Comp. Ex. 10 | 90 | C | 2.7 | 27 | 41 |
| Comp. Ex. 11 | — | B | 0.15 | 18 | 20 |

As is apparent from the results of evaluation shown in Table 3, the sintered body obtained by using the sintering material of any of Examples is superior in low porosity, superior or equal in cracking resistance, and superior in resistance to particle shedding to the sintered bodies of Comparative Examples 1 to 10 made by using sintering materials out of the scope of the invention.

All the sintered bodies of Examples are superior or equal in terms of resistance to cracking and low porosity to the thermal spray coating of Comparative Example 11 and superior in resistance to particle shedding to the thermal spray coating of Comparative Example 11.

The invention claimed is:

1. A sintering material comprising a granule containing a rare earth oxyfluoride (Ln-O—F),
    and having an apparent tap density of 1.0 to 2.5 g/cm$^3$, a 50% cumulative volume particle diameter ($D_{50N}$) of 10 to 100 am as measured before ultrasonication by laser diffraction/scattering particle size distribution analysis, a 50% cumulative volume particle diameter ($D_{50D}$) of 0.1 to 1.5 μm as measured after ultrasonication at 300 W for 15 minutes by laser diffraction/scattering particle size distribution analysis, and an X-ray diffraction pattern in which the maximum peak observed in the 2θ angle range of from 20° to 40° is assigned to a rare earth oxyfluoride of the form LnOF when analyzed by X-ray diffractometry using Cu-Kα or Cu-Kα$_1$ rays, and
    the sintering material having a ratio of the number of moles of oxygen (O) to the number of moles of the rare earth element (Ln) per kg of the sintering material, O/Ln molar ratio, of 0.85 to 1.10.

2. The sintering material according to claim 1, further comprising an organic polymer binder.

3. The sintering material according to claim 2, having a carbon content of 0.1 to 3 mass %.

4. The sintering material according to claim 1, having a loss-on-drying of 0.1 to 1.0 mass % when dried at 120° C. for 1 hour.

5. The sintering material according to claim 2, wherein the organic polymer binder contains at least one of a hydroxy group, a carbonyl group, and an ether linkage.

6. The sintering material according to claim 2, wherein the organic polymer binder comprises one or more selected from the group consisting of polyvinyl alcohol, polyvinyl butyral, methyl cellulose, carboxymethyl cellulose, an acrylic binder, polyethylene glycol, and polyvinylpyrrolidone.

7. The sintering material according to claim 1, wherein the rare earth element (Ln) is at least one of yttrium (Y), cerium (Ce), samarium (Sm), gadolinium (Gd), dysprosium (Dy), erbium (Er), and ytterbium (Yb).

8. The sintering material according to claim 7, wherein the rare earth element (Ln) is yttrium (Y).

9. The sintering material according to claim 8, having a ratio of the peak intensity ($S_2$) assigned to yttrium oxyfluoride of the form $Y_5O_4F_7$ observed in the 2θ angle range of from 31.8° to 32.8° to the maximum peak intensity ($S_1$) assigned to yttrium oxyfluoride of the form LnOF observed in the 2θ angle range of from 20° to 40°, $S_2/S_1$, of 0.2 or smaller in X-ray diffractometry using Cu-Kα or Cu-Kα$_1$ rays.

10. The sintering material according to claim 8, having a ratio of the peak intensity ($S_0$) of yttrium oxide ($Y_2O_3$) observed in the 2θ angle range of from 20.1° to 21.0° to the maximum peak intensity ($S_1$) of yttrium oxyfluoride of the YOF form observed in the 2θ angle range of from 20° to 40°, $S_0/S_1$, of 0.1 or less in X-ray diffractometry using Cu-Kα or Cu-Kα$_1$ rays.

11. A method for producing a sintered body, comprising sintering a granule containing a rare earth oxyfluoride (Ln-O—F),
    the granule having an apparent tap density of 1.0 to 2.5 g/cm$^3$, a 50% cumulative volume particle diameter ($D_{50N}$) of 10 to 100 μm as measured before ultrasonication by laser diffraction/scattering particle size distribution analysis, a 50% cumulative volume particle diameter ($D_{50D}$) of 0.1 to 1.5 μm as measured after ultrasonication at 300 W for 15 minutes by laser diffraction/scattering particle size distribution analysis, and an X-ray diffraction pattern in which the maximum peak observed in the 2θ angle range of from 20° to 40° is assigned to a rare earth oxyfluoride of the form LnOF when analyzed by X-ray diffractometry using Cu-Kα or Cu-Kα$_1$ rays, and
    the granule having a ratio of the number of moles of oxygen (O) to the number of moles of the rare earth element (Ln) per kg of the granule, O/Ln molar ratio, of 0.85 to 1.10.

* * * * *